United States Patent
Duquesne et al.

(10) Patent No.: US 6,958,012 B2
(45) Date of Patent: Oct. 25, 2005

(54) THRESHING MACHINERY CONCAVE ARRANGEMENTS

(75) Inventors: Frank R. G. Duquesne, Zwevegem (BE); Marc R. M. Jonckheere, Snellegem (BE); Christiaan A. C. Lippens, Sint-Laureins (BE); Dirk Desnijder, Wondelgem (BE); Thierry E. G. Devriese, Sint-Andries (BE)

(73) Assignee: CNH America LLC, Racine, WI (US)

( * ) Notice: Subject to any disclaimer, the term of this patent is extended or adjusted under 35 U.S.C. 154(b) by 184 days.

(21) Appl. No.: 10/600,025

(22) Filed: Jun. 19, 2003

(65) Prior Publication Data

US 2005/0009591 A1 Jan. 13, 2005

(30) Foreign Application Priority Data

Jun. 20, 2002 (GB) .............................. 0214114

(51) Int. Cl.⁷ .............................. A01F 12/28
(52) U.S. Cl. .......................... 460/76; 460/109
(58) Field of Search .................. 460/76, 109, 108, 460/59

(56) References Cited

U.S. PATENT DOCUMENTS

| | | | | |
|---|---|---|---|---|
| 5,190,497 A | * | 3/1993 | Heidjann | 460/76 |
| 5,395,287 A | * | 3/1995 | Coers | 460/113 |
| 5,743,795 A | * | 4/1998 | Kersting | 460/62 |

FOREIGN PATENT DOCUMENTS

EP 0092599 A1 4/1982

* cited by examiner

*Primary Examiner*—Meredith Petravick
(74) *Attorney, Agent, or Firm*—Rebecca Henkel; Brant T. Maurer

(57) ABSTRACT

A concave arrangement is disclosed for a threshing machine such as a combine harvester 10. The arrangement includes a concave 30 having a moveable rear portion 48 that is adapted to vary the break-over angle presented to straw passing downstream. A flap member 54 is provided that moves jointly with the moveable rear portion 48 and ensures that a gap G between the moveable portion 48 and a later processing stage such as a beater apparatus is kept substantially closed. Variation of the break-over angle influences the length of the straw leaving the threshing machine and the loading of the further separation and cleaning mechanisms.

19 Claims, 9 Drawing Sheets

THRESHING MACHINERY CONCAVE ARRANGEMENTS

FIELD OF THE INVENTION

The present invention relates to threshing machinery and in particular, but not exclusively, to improvements to concave arrangements associated with threshing and beating stages of a crop separation and/or cleaning operation in combine harvesters.

BACKGROUND OF THE INVENTION

A combine harvester usually includes a header attachment that is adapted to cut crop being harvested and that moves the harvested crop into a feeder housing. The feeder housing includes apparatus for lifting the cut crop into threshing and separation areas of the combine. Grain is then separated from stalks of the harvested crop by threshing, beating and possibly also rotary separation apparatus. The grain is then moved to a grain storage or distribution arrangement. Crop residue such as chaff and straw is commonly ultimately deposited onto the ground rearwards of the combine.

Conventional threshing, beating and rotary separation apparatus typically involve feeding the harvested crop between a rotating cylinder and a concave. Such rotating drums and stationary concaves are provided with protrusions or rubbing elements that rub the crop and cause the grain to separate from the ears.

The distance between the concave and the threshing drum is often considered a critical function and may be variable. The distance used may depend on a variety of factors, including for example the size and threshability of the grain. In addition, the concave to drum spacing may be variable to facilitate unplugging.

One problem that may arise involves straw damage and principally the breakage of stalks as threshed straw is passed over from a concave associated with a threshing drum to a concave associated with a beater or a rotary separator. If this occurs to a significant extent, the straw becomes less suitable for some purposes, such as bedding for live-stock. Moreover, short straw makes less neat and stable bales. Furthermore an excess of short straw particles reduces substantially the efficiency of the straw walkers and/or other separation systems. Broken straw may pass down through a gap between the concaves, thereby reducing efficiency of several stages of the cleaning procedure.

In EP-0092599 a device is proposed for varying the distance between a threshing drum of a combine harvester and at least one threshing grate/concave segment pivotally mounted on a threshing concave. The concave segment is moveable and is used to vary the distance between a rear portion of the concave and the threshing drum, this movement being controlled by an adjusting device and acting against a positioning force applied by a spring.

In CA-2130724, a concave for a combine harvester has a rear section that is moveable between a conventional mode position and a folded mode position. In the conventional mode position, the rear moveable section is positioned concentric with the thresher drum and, in the folded mode position, the rear section of the concave extends outwardly from the thresher drum.

In each of EP-0092599 and CA-2130724, a gap exists across the rear edge of the moveable section of concave, at least when in the concentric position. This creates a path by which cracked stalks and other chaff may potentially fall downward and decrease cleaning performance. It also diminishes the separation capacity of a beater drum that is installed behind the threshing drum.

SUMMARY OF THE INVENTION

It is an object of the present invention to provide improved threshing machinery and in particular, but not exclusively, to provide improvements to concave arrangements associated with threshing and beating stages of a crop separation and/or cleaning operation in combine harvesters.

Accordingly, the present invention provides a concave arrangement for a threshing machine, the arrangement comprising a first stage having a concave associated with a rotary member, said concave having a hinged portion that is positioned in an exit region of said concave and is pivotally moveable between a first position and a second position so as to vary in use the distance between said hinged portion and said rotary member, said concave arrangement further comprising a second stage downstream of and spaced apart from said first stage and adapted to receive material processed in use in said first stage and said arrangement further including a bridging means for bridging a gap between said first and second stages, said bridging means being pivotally moveable jointly with said hinged portion such that said bridging means substantially closes said gap in and between each of at least said first and second positions of said hinged portion.

In this manner, the break-over angle presented to straw in an exit region of a concave may be varied. This can influence the length of the straw leaving the threshing machine and the loading of the further separation and cleaning mechanisms. It is accomplished with a reduction in the path available for crop residue to escape downwards between a threshing concave and a further processing apparatus such as a beater arrangement. Said hinged portion and said bridging means may both be integral with said concave.

Movement of said bridging means may be substantially constrained to rotation about a pivot, such as a torsion rod.

Said concave and said hinged portion thereof may be moveable as an assembly towards or away from said rotary member, substantially regardless of the pivotal position of said hinged portion.

Said hinged portion and said bridging means may be connected together and jointly moveable by means of an over-centre mechanism.

Movement of said over-centre mechanism may be controlled by means of a torsion rod extending substantially across the width of said second portion.

Said bridging means may comprise a flap member, preferably perforated, that extends along said torsion rod and is fixed thereto. Said flap member may comprise one or more abutment portions that are adapted to locate or abut against said hinged portion in at least one of said first and second positions and preferably act as stop members in said position or positions.

Operation of said torsion rod may be constricted by a mounting associated with a frame of said threshing machine, whereby said torsion rod is adapted for movement along predefined guide paths such that said torsion rod is adapted to follow movement of said concave towards or away from said rotary member.

Said torsion rod may be controlled by means of a control lever, in the case of manual actuation said control lever preferably being mounted in a user accessible position or operable by means of remote control.

Said torsion rod may be provided with a blocking means adapted for holding said torsion rod in a substantially fixed position.

Said blocking means may comprise a resiliently loaded pin adapted to locate into an associated recess when said torsion rod is in a predetermined position.

Said concave arrangement may comprise a multiple stage concave arrangement adapted for threshing and separation of crops.

Said first stage may comprise a thresher apparatus and said second stage may comprise a beater apparatus, said concave arrangement optionally further comprising a rotary separator apparatus.

Movement of said hinged portion may be arranged in use to vary a break-over angle between two stages of crop processing, so as for example to control stalk breakage of crop passing between said stages.

Said concave arrangement may comprise a concave arrangement of an agricultural harvesting machine.

The present invention also provides a combine harvester including a concave arrangement according to the invention.

The present invention also provides a method of processing gathered material using a concave arrangement comprising a first stage having a concave associated with a rotary member, the method including varying with a rearwardly disposed hinged portion of said concave a break-over angle presented to material between said first stage and a second stage and varying said break-over angle by moving said hinged portion jointly with a hinged bridging means in such a manner that said hinged bridging means substantially closes a gap between said first and second stages in a plurality of positions of said hinged concave portion.

DETAILED DESCRIPTION OF A PREFERRED EMBODIMENT

The present invention will now be described with reference to certain embodiments and with reference to the above-mentioned drawings. Such description is by way of example only and the invention is not limited thereto. Left and right references are used as a matter of convenience and are determined by standing at the rear of the threshing machine and facing the end forwards to the normal direction of travel. Likewise, forward and rearward references are determined by the normal direction of travel of the threshing machine. Upward or downward orientations and horizontal or vertical planes are relative to the ground or operating surface. In addition, while the terms "grain", "straw" and "tailings" are used throughout the specification, this is principally for convenience and the terms are not intended to be limiting. Thus, "grain" refers to the part of gathered crop that is threshed and separated from the discardable part of the crop material, which is referred to as "straw". Incompletely threshed ears are referred to as "tailings". Furthermore, for convenience the specific but non-limiting examples discussed herein will concentrate on combine harvesters equipped with straw walkers, although it will be appreciated that similar arrangements may also be provided in other forms of agricultural crop processing machinery such as combine harvesters equipped with a rotary separation system. It will also be noted that the threshing machinery need not be self propelled and that embodiments exist which are stationary or may be in trailer form, in either case being adapted to be driven or towed for material processing by an external input such as a tractor power take-off.

Figure 1:
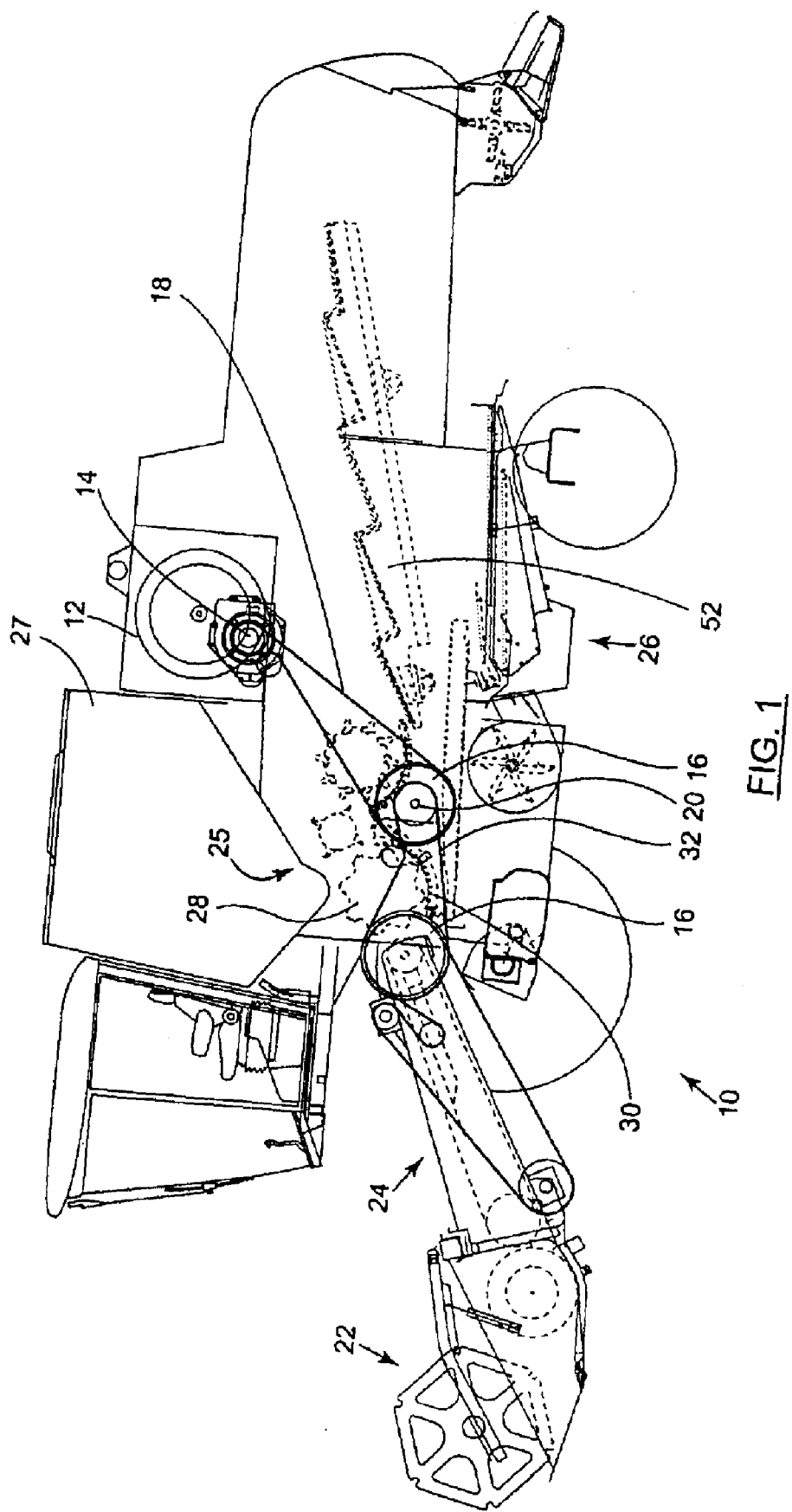
FIG. 1 is a left-hand side elevation of a threshing machine including an arrangement according to an embodiment of the present invention.

Referring to the drawings and for the moment in particular to FIG. 1, a threshing machine in the form of a self-propelled combine harvester 10 includes a prime mover in the form of a diesel engine 12. The engine 12 may be adapted to operate at a substantially constant speed and to vary its output torque to the meet the demand of a plurality of belt and/or chain drives powered off a directly driven engine output pulley 14. Torque output of the engine 12 is controlled by varying its fuelling. However, the present invention may be applied to threshing machinery whose prime mover does not operate at constant speed. The belt/chain drives are preferably disposed in substantially vertical planes, such that gravity does not pull the belts/chains off their drive wheels, which may be pulley wheels or sprocket wheels respectively as the case may be.

An intermediate drive pulley 16 is supplied with drive from the engine output pulley 14 via an intermediate drive belt 18 and drive to subsystems of the combine 10 is taken either directly or indirectly from an intermediate shaft 20 driven by the intermediate pulley 16.

A header attachment 22 and associated feeder mechanism 24 are adapted to gather and supply crop to a multi-stage crop separation apparatus. The crop may comprise, for example, wheat, corn, rice, soybeans, rye, grass seed, barley, oats or similar. Grain which has been separated from the straw falls onto a grain cleaning mechanism 26, which comprises means to separate chaff and other impurities from the grain and means to separate unthreshed or partly threshed material (tailings). Cleaned grain is then elevated into a grain tank 27 and the tailings are fed either to a separate rethresher or back to the crop threshing and separation apparatus 25 for a renewed threshing action.

The crop threshing and separation apparatus 25 includes a first stage referred to as a thresher mechanism and comprising a rotary member in the form of a thresher drum 28 and an associated thresher concave 30. The thresher drum 28 includes a series of rasp bars 32 adapted to co-operate with stationary transfer slats 34 of the thresher concave 30.

Rearwards/downstream of the thresher mechanism 28, 30, the crop threshing separation apparatus 25 includes a second stage referred to as a straw beater mechanism and comprising a rotary member in the form of a beater drum 36 and an associated perforated beater grate 38. The straw beater drum 36 may be of a smaller diameter than the thresher drum 36 and includes a series of deflector plates 40 that extend the full width of the straw beater drum 36 and are inclined rearwards to the direction of rotation of the beater drum 36 (which like the thresher drum 28 rotates anti-clockwise as viewed in the figures). The plates 40 may be replaced with sets of pins for improved conveyance of long-stemmed crops.

Rearwards/downstream of the beater mechanism 36, 38 may be included an optional third stage to the threshing and separation apparatus 25, referred to as a rotary separator mechanism and comprising a rotary member in the form of a rotary separator rotor 42 and an associated separator concave 44. The separator rotor 42 may be of substantially the same diameter as the thresher drum and carries a plurality of tines 46 adapted to co-operate with the separator concave 44 to further separate residual grain.

The last stage of the threshing and separation apparatus includes a set of juxtaposed straw walkers 52 that are mounted to a pair of transverse crankshafts for circular movement. The crop material delivered thereto by the straw beater mechanism or the rotary separator mechanism as the case may be, is received on top of the straw walkers and transported rearwardly in an oscillatory movement. The top surface of the straw walkers 52 may be perforated for allowing passage of residual grains to the straw walker bottom, which guides the grains forwardly and downwardly to the cleaning mechanism 26.

Turning now to FIGS. 2 to 6, more detailed consideration will be given to the threshing and beating mechanisms and in particular to variation of break-over angle presented to straw passing from an exit region of the thresher mechanism 28, 30 to the beater mechanism 36, 38.

Figure 2:
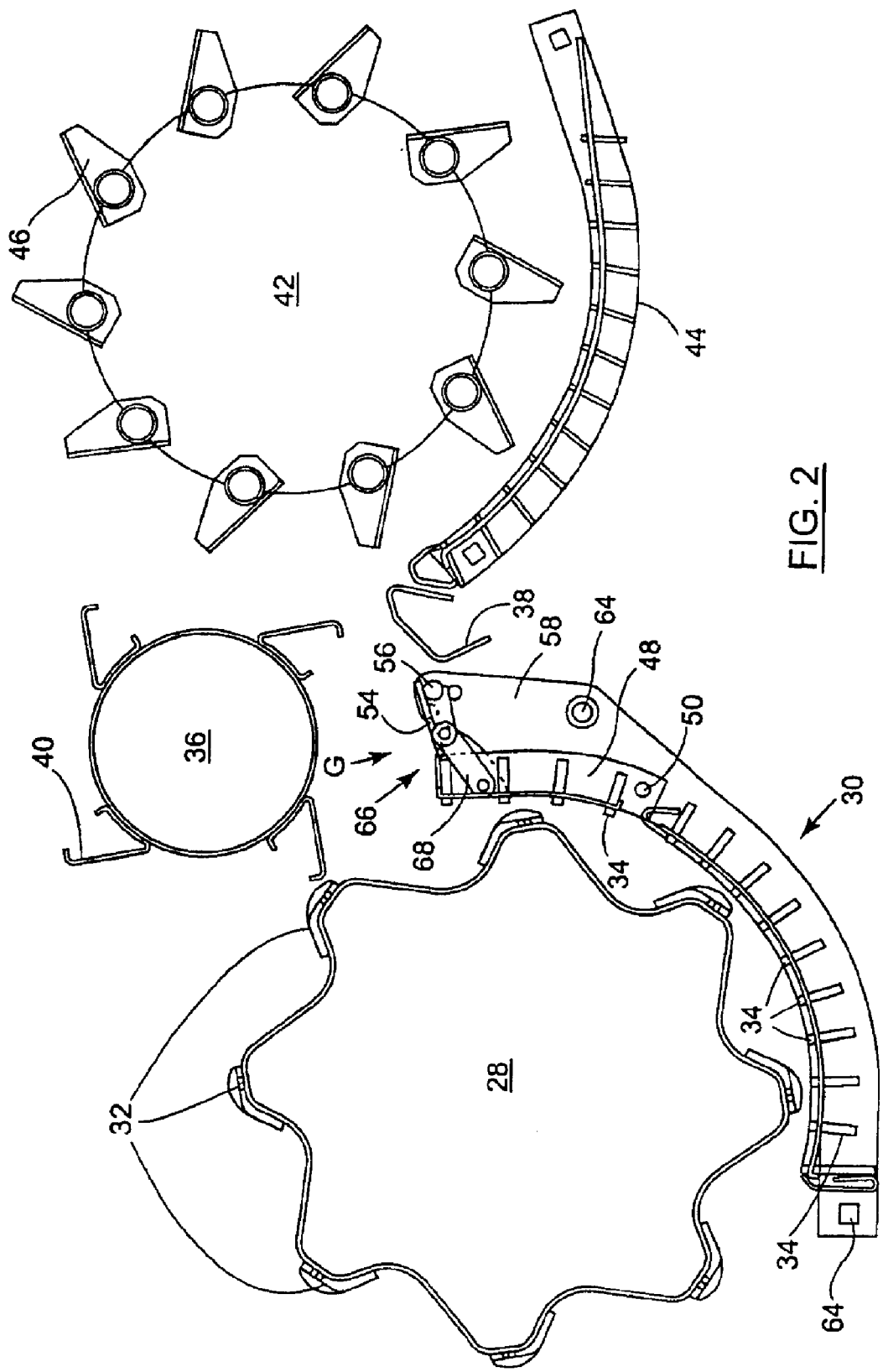
FIG. 2 is an enlarged view of part of a concave arrangement of the machine of FIG. 1 in a first position.
Figure 3:
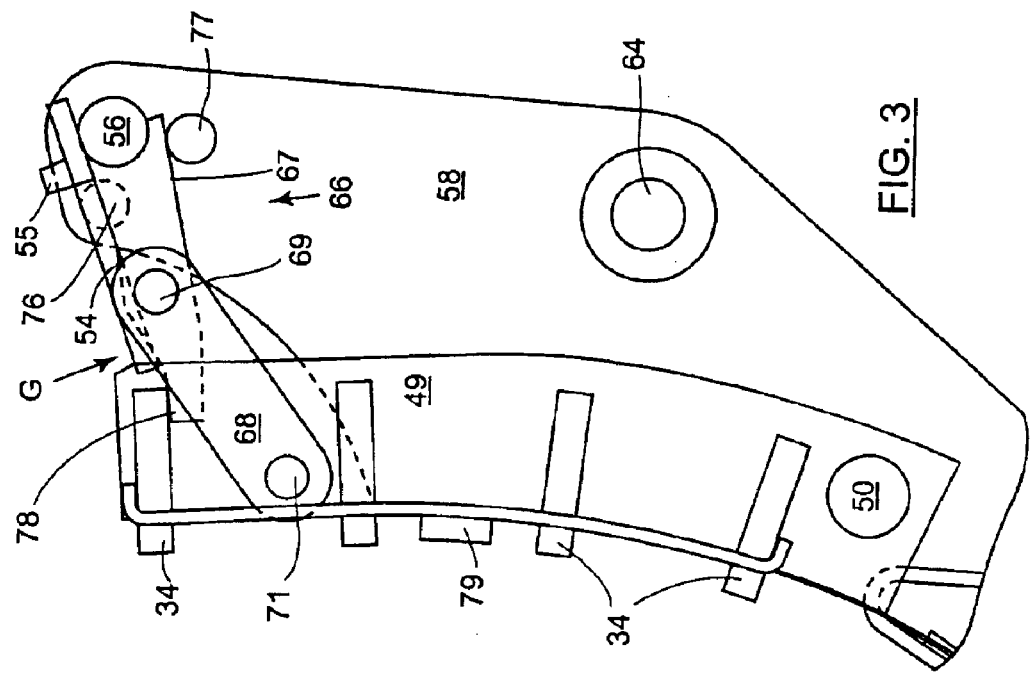
FIG. 3 is a close-up view of part of FIG. 2.
Figure 4:
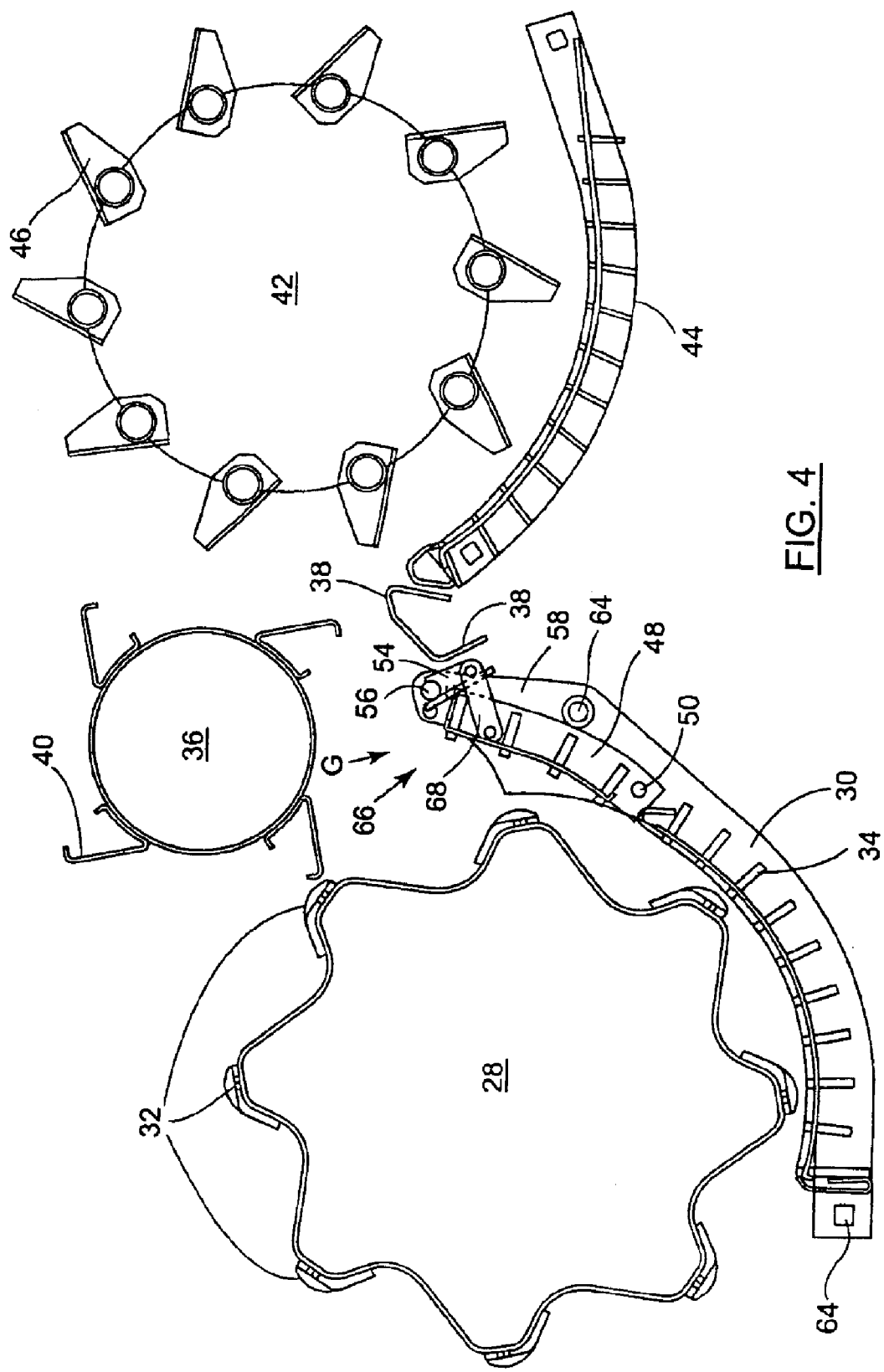
FIG. 4 is a view of the concave arrangement of FIG. 2 in a second/lowered position.

The thresher concave 30 includes in an upper rear section a hinged portion 48 that is adapted to move by pivoting about a hinge pin 50 so as to vary the distance between that hinged portion 48 and the thresher drum 28, e.g. in the region of the concave 30 from which threshed crops exit that concave 30 and approach the beater drum 36. In FIG. 2, a first position is illustrated, in which the hinged portion 48 is in a first or closed position and extends the circumference of a cylinder substantially concentric with the thresher drum 28, thereby maintaining substantially the same distance to the thresher drum 28 as the main part of the concave 30. This position is shown in close-up detail in FIG. 3. In FIG. 4, a second position is illustrated, in which the hinged portion 48 is in a second or open position behind the fixed concave portion, but wherein it extends away from the cylinder scribed by the stationary concave portion, thereby increasing the distance of the hinged portion 48 to the thresher drum 28 compared with that of the main concave 30. This arrangement reduces the break-over angle presented to straw approaching the trajectory of the beater drum 36 and therefore helps reduce straw breakage in this region. This position is shown in close-up detail in FIG. 5.

When the hinged portion is in the closed position, however, a gap G exists between the rear edge of the hinged portion 48 and the beater grate 38. This gap G extends across the width of the thresher concave 30 to beater grate 38. Such a gap G presents a passage to chaff or other debris to fall down into the grain cleaning area, which may contaminate the grain already collected and overload the cleaning mechanism 26. In the open position illustrated in FIGS. 4 and 5, however, the gap G is minimal. The present invention addresses this situation by providing an arrangement that ensures that the gap G is kept to a practical minimum and without interfering in the passage of straw further down stream or with the movement of straw onto a set of straw walkers 52 at the end of the threshing, beating and separating processes.

The gap G is substantially closed at each position of the hinged portion 48, the closure being effected by a bridging means in the form of a flap member 54. The flap member 54 is preferably perforated, e.g. in a similar configuration to the beater grate 38, and extends across substantially the whole width of the hinged concave portion 48. For enhanced separation action, it is preferably also provided with a transverse bar 55 which may be welded to the top surface of the flap member 54. The member 54 is constrained to rotation about a pivot axis, in the form of a torsion rod 56 along which the flap 54 is attached.

The torsion rod 56 passes through pivot holes defined in side flanges 58 of the thresher concave 30 and is adapted and constricted to ride along guide slots 60 (shown in FIG. 12) defined in a mounting arrangement associated with or formed in side panels of a frame 62 of the combine 10. The guide slots 60 allow the torsion rod 54 to follow concave position variations made by movement of the thresher concave assembly 30, 48 towards or away from the thresher drum 28, such movements being made about suspension points 64, e.g. for adjusting concave-to-drum clearance to accommodate varying crop conditions or for unplugging.

Figure 6:
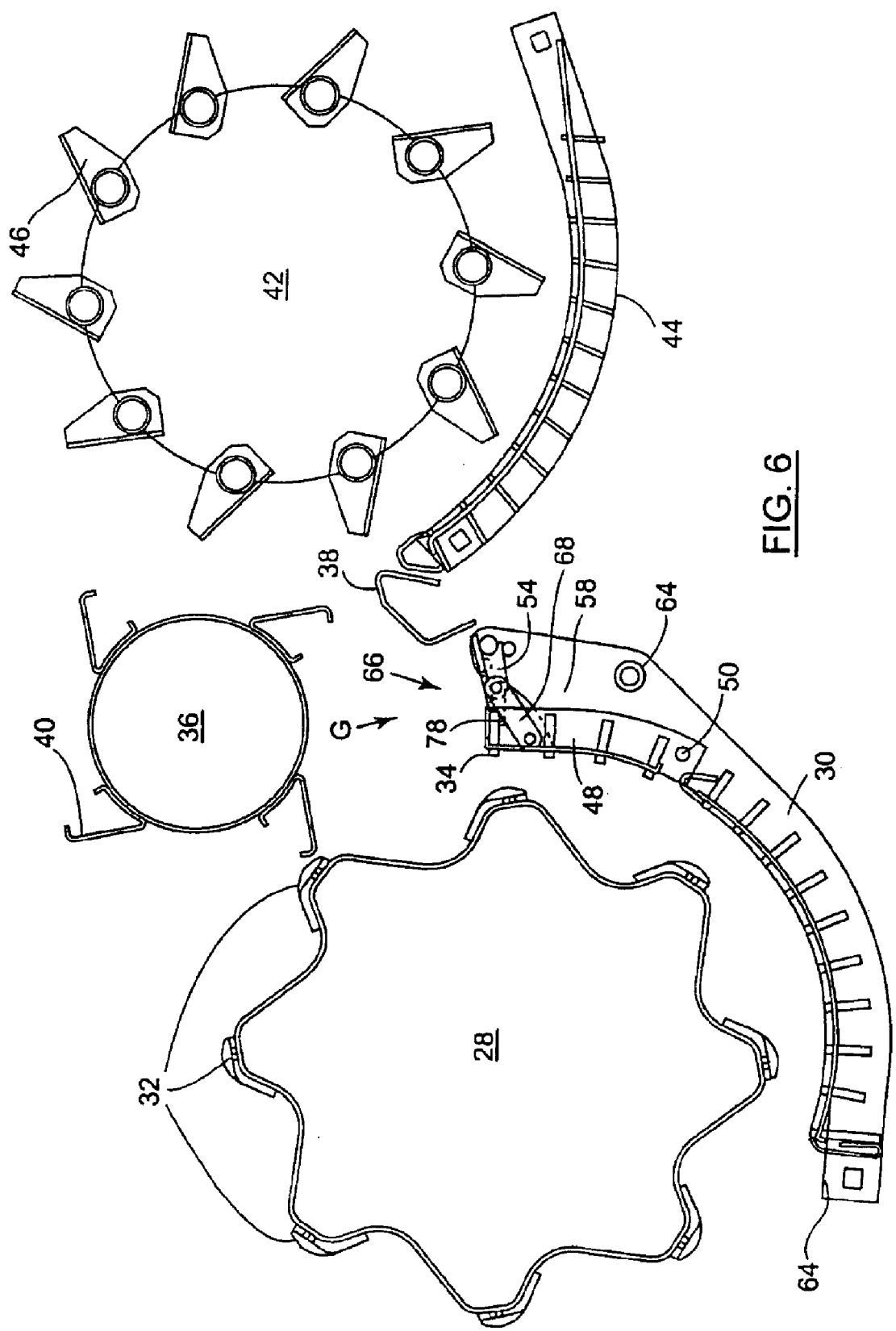
FIG. 6 is a view of the concave arrangement of FIG. 2, showing the front concave in a first/raised position.
Figure 7:
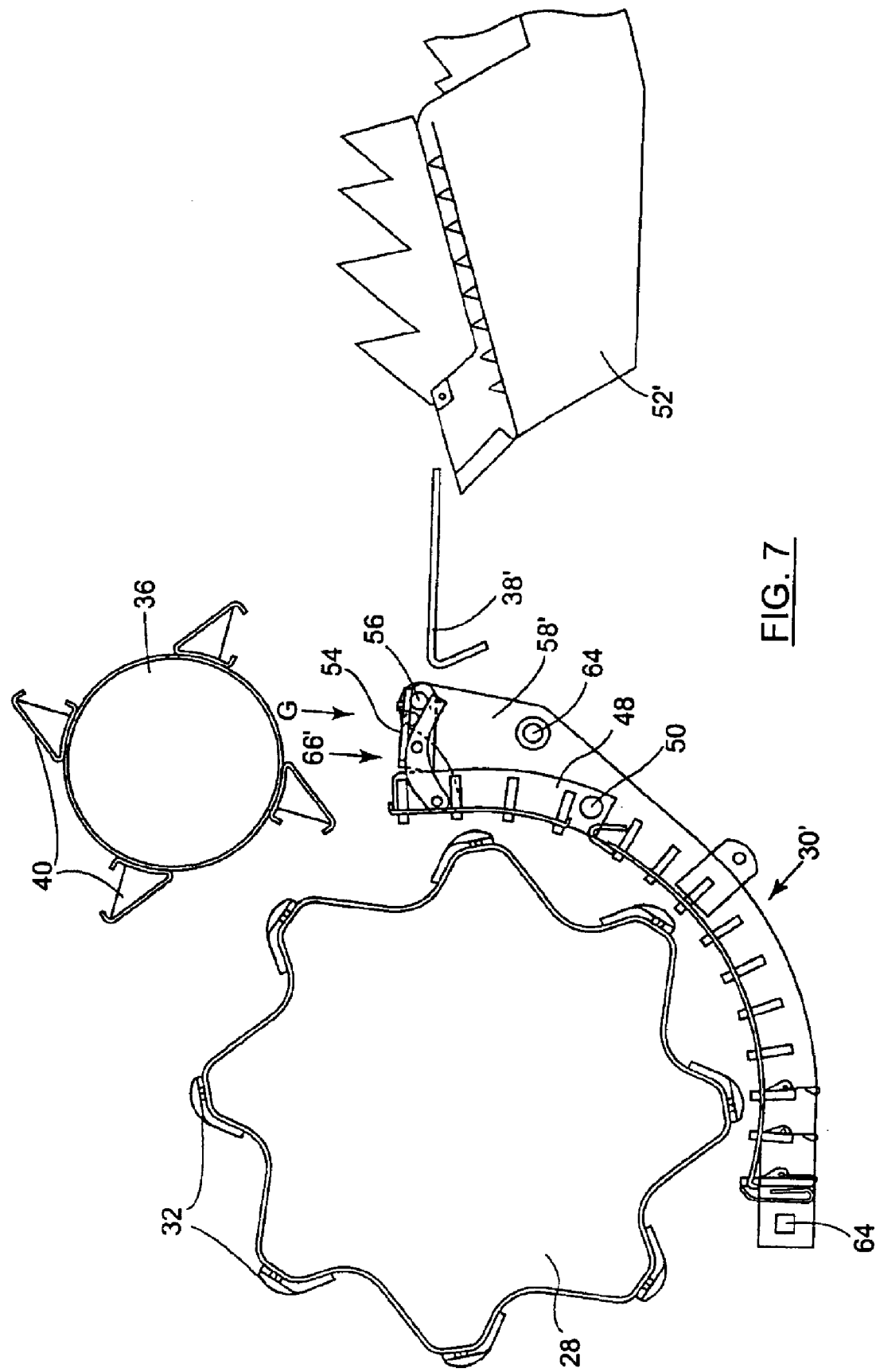
FIG. 7 is a view of an alternative concave arrangement for a threshing machine without rotary separator.

FIG. 2 illustrates a small concave to drum clearance. In FIG. 6, the concave adjustment mechanism (not shown) connected to the suspension points 64 has lowered the thresher concave 30 to a position more remote from the threshing drum 28. It is worth noticing that during clearance adjustment the hinged concave portion 48 remains connected to the concave 30 only, such that the mechanism moves both the concave 30 and its hinged portion 48 in unison, without change to their relative position.

The flap member 54 is connected to the hinged concave portion 48 by means of an over-centre mechanism 66, which includes linkage members 67, 68 adapted to provide joint movement of the flap 54 and the hinged concave portion 48. The mechanism 66 comprises two linkage members 67 which are welded to the torsion rod 56 and the flap member 54 at positions substantially inwards from the side flanges 58. Two further linkage members 68 are pivotally connected to the first linkage members 67 by two pins 69, and to intermediate support plates 49 of the hinged concave portion 48 by further pins 71. The first linkage members 67 are provided with one or more abutment portions that are adapted to locate or abut against the hinged concave portion 48 in at least one or the other of the open and closed positions. In FIG. 3, for example, it can be seen that the flap may be provided with abutment portions in the form of toes 78 which tuck under the uppermost thresher concave transfer slat 34. Further abutments 79 are welded to the side flanges 58 of the concave 30 to limit the forward travel of the hinged concave portion 48.

Control of the over-centre mechanism 66 is exercised by rotating the torsion rod 56, either manually or by remote control. In the embodiment illustrated, the torsion rod 56 is turned manually using a control lever in the form of a handle 70 external to the frame 62. To facilitate manual operation, the handle 70 is attached to an outboard end of the torsion rod 56 and is user accessible from outside the frame 62.

Figure 11:
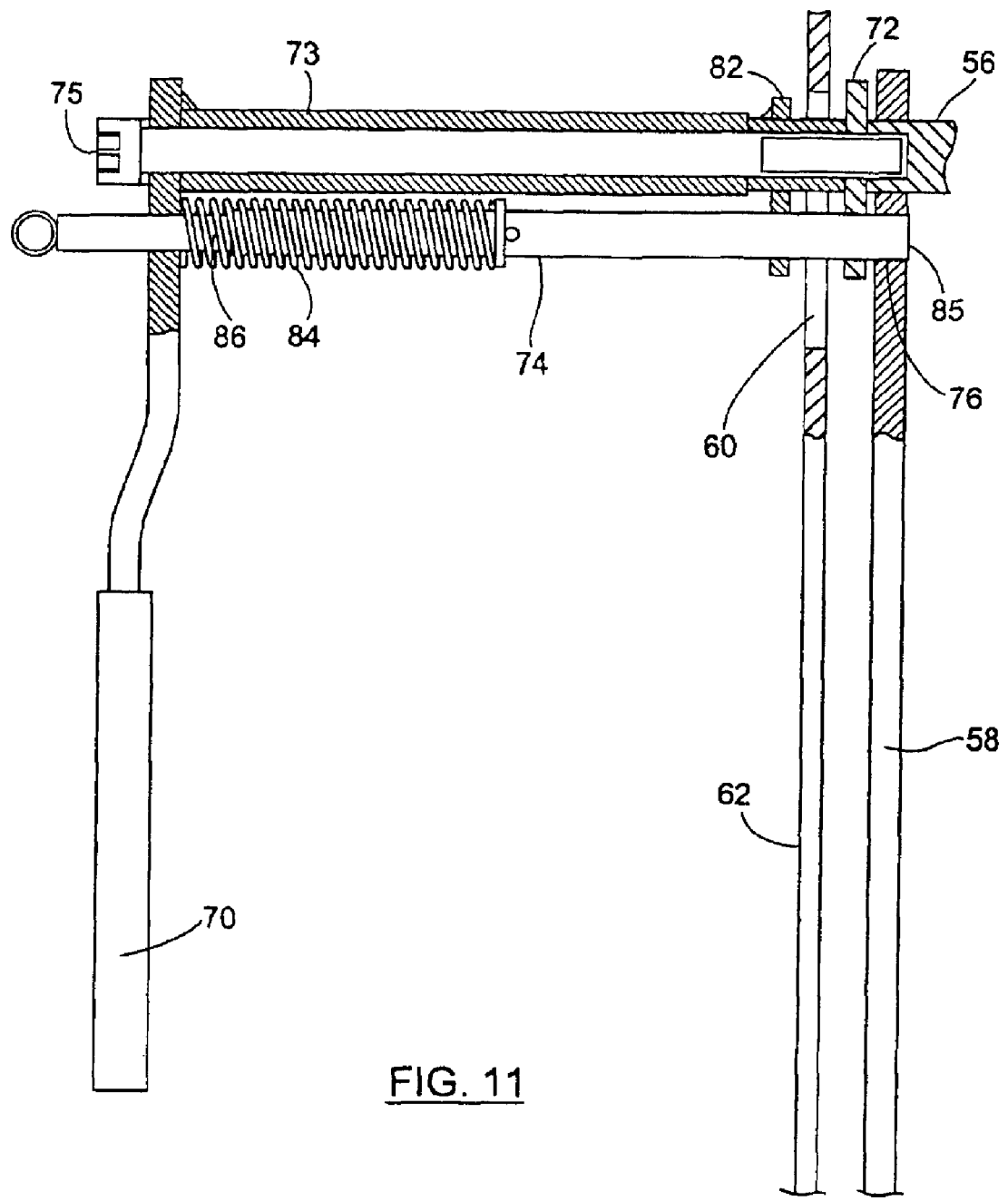
FIG. 11 is a plan view of part of an operating mechanism for moving the concave arrangements of the previous Figures between their first and second positions.
Figure 12:
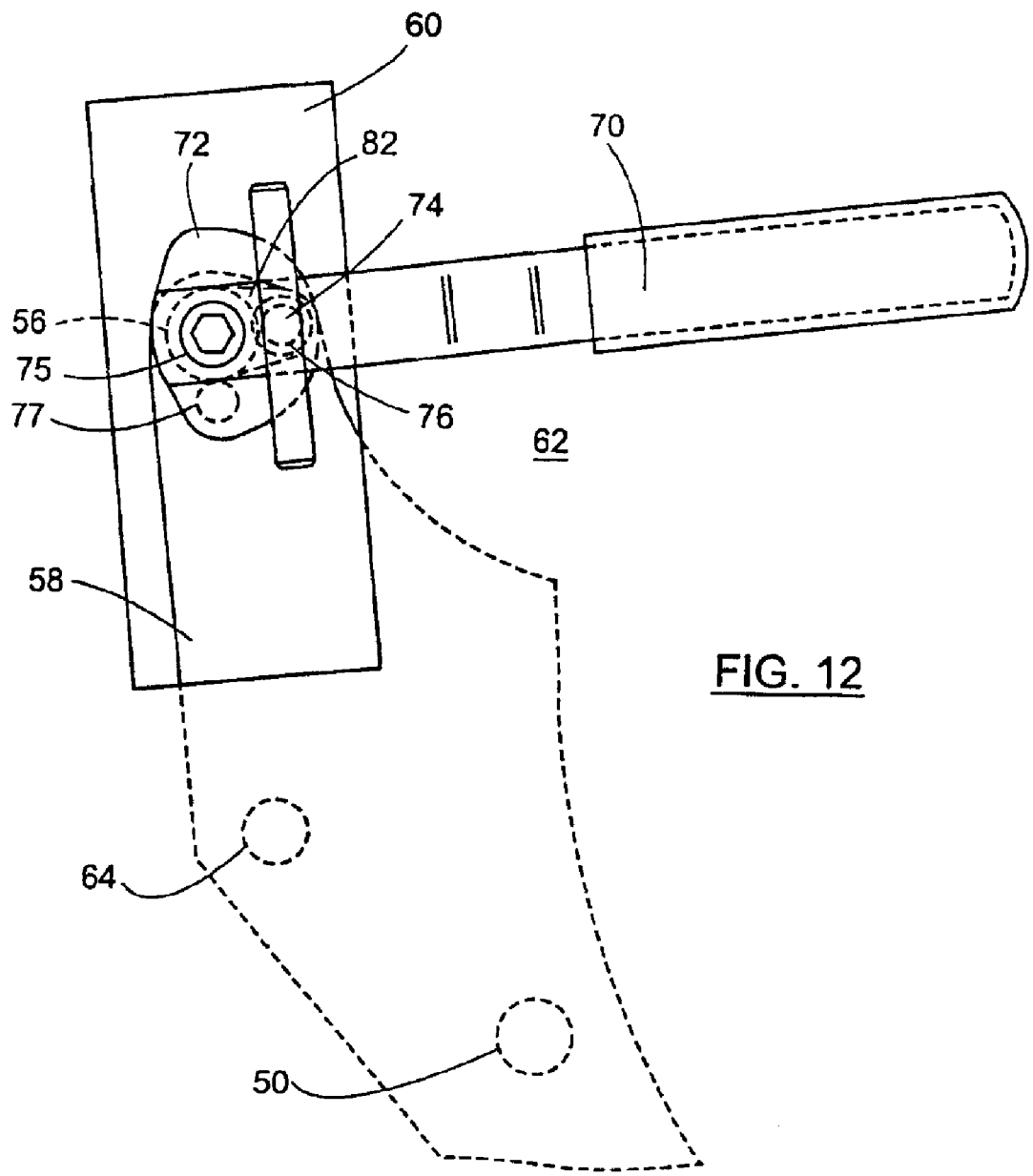
FIG. 12 is a side view of the operating mechanism of FIG. 11.

As illustrated in FIGS. 11 and 12, a semi-circular pivot plate 72 is welded to an end of the torsion rod 56, outboard of the side flange 58. Rotation of this plate 72 by the handle 70 jointly moves the hinged concave portion 48 and the flap member 54 between the positions shown in FIGS. 3 and 5. The embodiment of FIGS. 11 and 12 shows a configuration for the right hand side of the threshing machine 10, but a left hand version may readily be realised by taking a mirror image of this embodiment.

The handle 70 is welded to a tube 73 that is held by a long bolt 75 against the outer face of pivot plate 72. The end of bolt 75 is screwed into a threaded hole in the end of torsion rod 56. Adjacent the frame 62 the tube 73 is provided with a follower plate 82 which has a hole for insertion of a locking pin 74. This pin extends through the outer surface of the handle 70, through the follower plate 82, through a hole in the pivot plate 72 and into one of the locking recesses 76, 77 defined in the side flange 58. A compression spring 84 biases the locking pin 74 inwardly towards the side flange 58. The pin can be pulled outwardly to remove its tip 85 from the recess 76 or 77, but its outward movement is restricted by a collar 86 which precludes that the tip 85 gets detached from the pivot plate 72. When the locking pin 74 is inserted in one the recesses 76, 77, it locks the pivot plate 72 and hence blocks the torsion rod 56 and the flap member 54 in a position fixed to the remainder of the concave 30. It thereby prevents top loading of the flap 54 from opening the over-centre mechanism 66, at least to within the shear limits of the locking pin 74.

Figure 5:
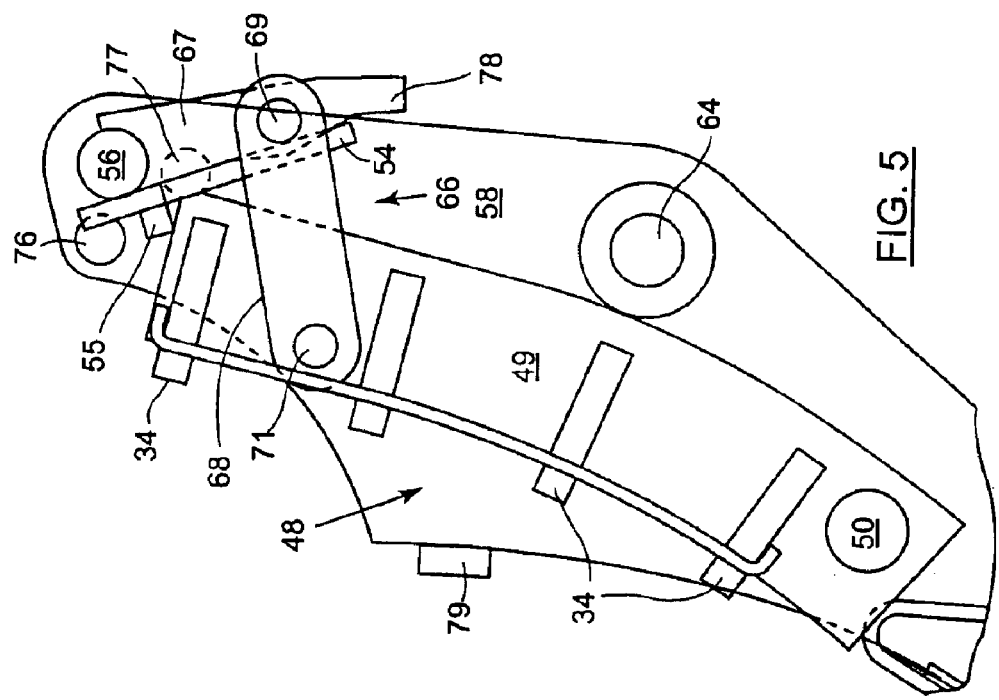
FIG. 5 is a close-up view of part of FIG. 4.

Before moving the concave portion 48 from the open position illustrated in FIGS. 4 and 5 to the closed positioned in FIGS. 2 and 3, the operator first pulls locking pin 74 out of the recess 77 to release the over-centre mechanism 66. Then the handle 77 is turned to rotated the flap member 54 forwardly and upwardly. The link members 67, 68 force the concave portion 48 forwardly until its support plates 49 contact the abutments 79. Further rotation of the handle 70 causes a slight deformation of the tension rod 56 and/or the flap member 54, allowing the link members 67, 68 to go over-centre and reach the position shown in FIG. 3. The toes 78 contact the upper concave slat 34 and preclude further movement of the link members 67, 68 and the flap member 54.

In this position the tip 85 of lock pin 74 is inserted in the upper recess 76 to preclude downward movement of the flap member 54 under vertical loads, e.g. from accumulated crop, on its upper surface. The crop also forces the hinged concave portion 48 rearwardly during threshing operations, possibly beyond the strength of the over-centre mechanism 66. However, after only a slight deformation, the rear end of the upper concave slat 34 contacts the front of the flap member 54 which assumes the rearward forces and prevents further deformation or movement of the hinged portion 48.

From this position, illustrated in FIGS. 2 and 3, the hinged concave portion 48 may be rotated to the open position shown in FIGS. 4 and 5. Once the pin 74 is released by pulling it out of its locking recess 76, the handle 70 may be turned so as to turn the torsion rod 56 and consequently also the flap 54. As the flap 54 is lowered, the link members 67, 68 pull the hinged concave portion 48 backwards about its pivot 50 and towards the open position. The movement continues through intermediate positions, and eventually into the open position illustrated in FIGS. 4 and 5, where the support plates 49 contact the bushings at suspension points 64. The flap 54 is locked into this lower position by insertion of the tip 85 of the locking pin 74 into the lower recess 77. This locking operation prevents uncontrolled vibration of the flap 54, and, via the link members 67, 68, of the hinged concave portion 48.

At each stage of the joint movement of hinged portion 48 and flap 54, it can be noted that their arcs of rotation are adapted to both avoid interference between their respective pivoting movements and to ensure that the gap G remains substantially closed at all times.

Figure 10:
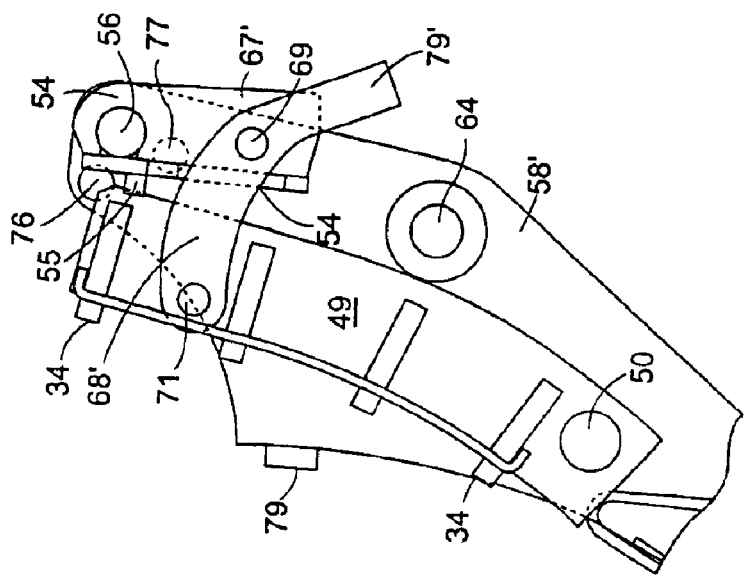
FIG. 10 illustrates the partial view of FIG. 8, with the concave arrangement in the second position
Figure 9:
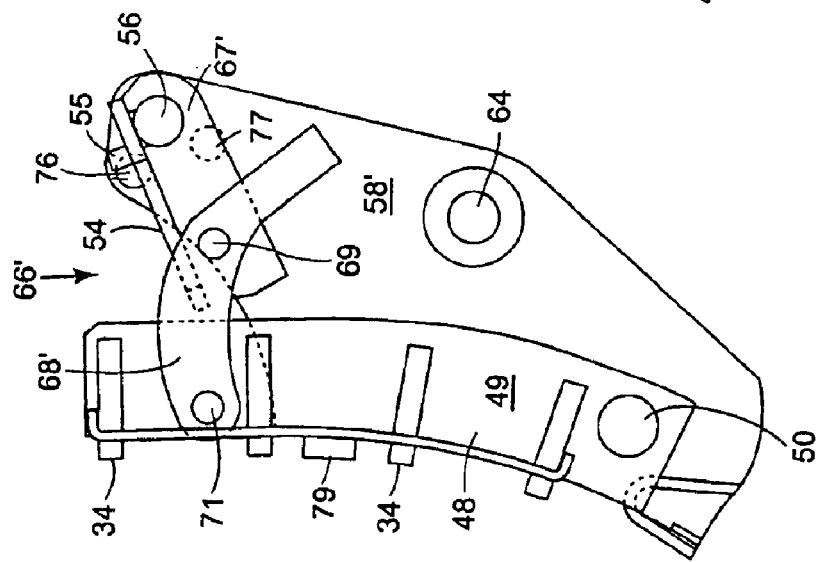
FIG. 9 is a close-up view of a position in between the first and second positions.
Figure 8:
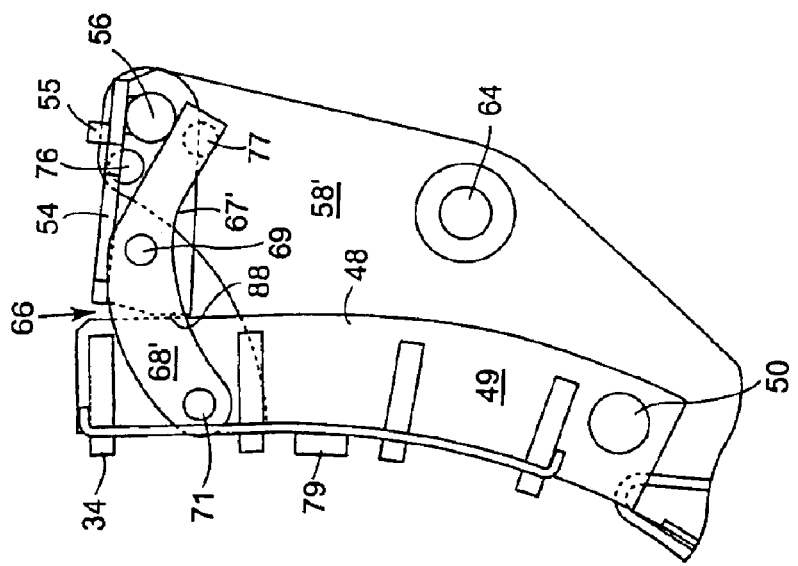
FIG. 8 is a close-up view of part of FIG. 7 in the first position.

FIGS. 8–10 illustrate a similar concave arrangement for a threshing machine that has no rotary separator mechanism. The beater drum 36 delivers the threshed crop material directly onto the front portion of the straw walkers 52', which may have an additional front step to compensate for the volume of the rotary separator rotor 42.

The space between the rear end of concave 30' and the front end of the straw walkers 52' is bridged by a stationary rake 38'. It will be appreciated that in this embodiment the crop material leaves the thresher mechanism at an angle that is less steep than in the previous embodiment. Therefore the rear end of side flange 58' is shortened slightly.

Most components are identical and operate in substantially the same manner. However, the over-centre mechanism 66' has been modified to better accommodate the link members 67', 68'. First link member 67' is welded to the torsion rod 56 and the flap member 54. The second member 68' is linked to the first member 67' by a pivot pin 69 and to a support plate 49 of the hinged concave portion 48 by a further pin 71.

The second link member 68' has a rearwardly extending tail 79' which acts as an abutment when the concave arrangement is in its first (closed) position. Herein the top of the tail 79' contacts the lower side of the torsion rod 56, thereby preventing further upward movement of the concave portion.

The front portion of the first link member 67' is provided with a contact surface 88 which may be engaged by the rear edge of a concave support plate 49, when the latter is pushed rearwardly by the processed crop material. This precludes further rearward movement or deformation of the hinged concave portion 48.

It can thus be seen that, according to the present invention, the break-over angle presented to straw passing downstream from the thresher apparatus (or other equipped concave arrangement) can be varied with minimal gap and straw cracking. The hinged portion 48 is attached only to the concave 30 with which it is associated and not to the frame 62. In addition, movement of an equipped concave 30, 48 towards or away from its associated drum is possible without negating the benefits of the invention, this also being the case under suspension movement or unplugging operations. The arrangement can be used with or without multi-threshing arrangements. In the closed position (FIGS. 2, 3, 7 and 8) the flap acts as an extension of the beater grate 38 and in all positions there is a minimal gap G.

While the present invention has been particularly shown and described with respect to a preferred embodiment, it will be understood by those skilled in the art that changes in form and detail may be made without departing from the scope and spirit of the invention.

What is claimed is:

1. concave arrangement for a threshing machine, the arrangement comprising a first stage having a concave associated with a rotary member, said concave having a hinged portion that is positioned in an exit region of said concave and is pivotally moveable between a first position and a second position so as to vary in se the distance between said hinged portion and said rotary member, said concave arrangement further comprising a second stage downstream of and spaced apart from said first stage and adapted to receive material processed in use in said first stage and said arrangement further including a bridging means for bridging a gap between said first and second stages, said bridging means being pivotally moveable jointly with said hinged portion such that said bridging means substantially closes said gap in and between each of at least said first and second positions of said hinged portion, wherein said hinged portion and said bridging means are connected together and jointly moveable by means of an over-centre mechanism.

2. An arrangement according to claim 1, wherein said hinged portion and said ridging means are both directly connected to said concave.

3. An arrangement according to claim 1, wherein movement of said bridging means is substantially constrained to rotation about a pivot.

4. An arrangement according to claim 3, wherein said pivot comprises a torsion rod.

5. An arrangement according to claim 1, wherein said concave and said hinged portion thereof are moveable as an assembly towards or away from said rotary member, substantially regardless of the pivotal position of said hinged portion.

6. An arrangement according to claim 1, wherein movement of said over-centre mechanism is controlled by means of a torsion rod extending substantially cross the width of said second portion.

7. An arrangement according to claim 6, wherein said bridging means comprises a flap member that extends along said torsion rod and is fixed thereto.

8. An arrangement according to claim 7, wherein said flap member is perforated.

9. An arrangement according to claim 6, wherein said flap member comprises one or more abutment portions that are adapted to locate or abut against said hinged portion in at least one of said first and second positions and act as stop members in said position or positions.

10. An arrangement according to claim 6, wherein operation of said torsion rod is constricted by a mounting associated with a frame of said threshing machine, whereby said torsion rod is adapted for movement along predefined guide paths such that said torsion rod is adapted to follow movement of said concave towards or away from said rotary member.

11. An arrangement according to claim 6, wherein said torsion rod is controlled by means of a control lever, in the case of manual actuation said control lever being mounted in a user accessible position or operable by means of remote control.

12. An arrangement according to claim 6, wherein said torsion rod is provided with a blocking means adapted for holding said torsion rod in a substantially fixed position.

13. An arrangement according to claim 12, wherein said blocking means comprises a resiliently loaded pin adapted to locate into an associated recess when said torsion rod is in a predetermined position.

14. An arrangement according to claim 1, wherein said concave arrangement further includes a third stage and is adapted for threshing and separation of crops.

15. An arrangement according to claim 1, wherein said first stage comprises a thresher apparatus and said second stage comprises a beater apparatus.

16. An arrangement according to claim 15, further comprising a rotary separator apparatus.

17. An arrangement according to claim 15, wherein movement of said hinged portion is arranged in use to vary a break-over angle between two stages of crop processing, so as to control stalk breakage of crop passing between said stages.

18. A concave arrangement for a combine harvester, the arrangement comprising a first stage having a concave associated with a rotary member, said concave having a hinged portion that is positioned in an exit region of said concave and is pivotally moveable between a first position and a second position so as to vary in se the distance between said hinged portion and said rotary member, said concave arrangement further comprising a second stage downstream of and spaced apart from said first stage and adapted to receive material processed in use in said first stage and said arrangement further including a bridging means for bridging a gap between said first and second stages, said bridging means being pivotally moveable jointly with said hinged portion such that said bridging means substantially closes said gap in and between each of at least said first and second positions of said hinged portion, wherein said hinged portion and said bridging means are connected together and jointly moveable by means of an over-centre mechanism.

19. A method of processing gathered material using a concave arrangement comprising a first stage having a concave associated with a rotary member, the method including varying with a rearwardly disposed hinged portion of said concave break-over angle presented to material between said first stage and a second stage and varying said break-over angle by moving said hinged portion jointly with a hinged bridging means via an over-centre mechanism in such a manner that said hinged bridging means substantially closes a gap between said first and second stages in a plurality of positions of said hinged concave portion.

* * * * *